Patented Feb. 7, 1939

2,145,907

UNITED STATES PATENT OFFICE 2,145,907

THERAPEUTICALLY ACTIVE PRINCIPLE FROM ERGOT AND PROCESSES FOR ITS PRODUCTION

Otto Wolfes, Darmstadt, Germany, assignor to Merck & Co. Inc., Rahway, N. J., a corporation of New Jersey No Drawing. Application November 27, 1935, Serial No. 51,887. In Germany November 27, 1934

5 Claims. (Cl. 260—236)

This invention relates to therapeutically active compounds from ergot, and to processes for their production. More particularly, it relates to the production of such compounds from a new principle found in ergot, belonging to the group of so-called dyestuffs obtainable from that source.

Certain yellow crystalline ergot "dyes" have been known previously, as for instance ergoflavin and ergochrysin. Ergoflavin, $C_{15}H_{14}O_7$, has a melting point of 344° C. and is easily soluble in chloroform, acetone, alcohol, and in hot glacial acetic acid. Ergochrysin, $C_{28}H_{28}O_{12}$, has a melting point of 260° C., with decomposition, is difficultly soluble in 150 parts of boiling chloroform, acetone, and hot alcohol, somewhat more soluble in hot glacial acetic acid, and crystallizes from this, on cooling, in characteristic rhombic plates which often conglomerate in rosette form; it is also very difficultly soluble in toluol.

I have now succeeded in producing another such "dye" from ergot which is clearly distinguishable from the known substances described above.

The new principle produced according to my process has the formula $C_{32}H_{30}O_{14}$, is of yellow color, and melts with decomposition at about 263°C. at a pressure of about 30 mm. of mercury. It is insoluble in most solvents, even in hot alcohol and hot toluol. It is soluble, but very difficultly, in hot glacial acetic acid, and in 1400 parts of boiling chloroform.

Generally speaking, my process for producing this new ergot principle consists in freeing the ergot from alkaloids and fatty substances by the usual methods, extracting the residue with large quantities of an organic solvent adapted to dissolve out the known ergot "dyes", thus separating the characteristically very slightly soluble new principle from the ergoflavin and ergochrysin, and purifying the new product by crystallization from a suitable solvent such as ethylene-chlorhydrin or phenol.

The suitability of any other given solvents for the extraction of the ergot "dyes" can easily be determined by their ability to dissolve the "dyes" in a test treatment on ergot. Such solvents include chlorinated hydrocarbons, particularly chloroform or dichloro-ethylene; chlorinated alcohols, for example, ethylene chlorhydrin, or phenols such as phenol and cresol. When such solvents are used, the separation of the known "dyes", ergoflavin and ergochrysin, from the new material may be effected without difficulty.

Alternately, the new principle may be isolated by extracting the ergot directly with large quantities of a solvent which is capable of dissolving the known yellow ingredients of ergot, ergoflavin and ergochrysin, whereby the alkaloids and fats in the ergot are also dissolved out. These latter may be removed from the combined extract thus obtained by known extraction methods. For example, the alkaloids may be removed by extraction with weakly acid solutions and the fats by extraction with petroleum ether, benzene, or ether. The remaining mixture will then consist mainly of ergot "dyes", and from it the new, most difficultly soluble, principle can be isolated by the separatory method described above. Knowing the characteristic solubility differences which have been determined by me, and set forth herein, various adaptations of the steps of the processes and choice of solvents may obviously be made without departing from the scope and spirit of the invention.

The following examples are presented to illustrate the manner in which the invention may be practiced, without, however, limiting myself to the precise terms thereof.

*Examples*

I. 100 kg. of ground ergot are leached with 500 to 1000 kg. of ethyl alcohol, and the collected extracts are treated with hydrochloric acid until acidic to congo, and then separated from the greater part of the alcohol by evaporation. The residue is stirred three times, with water, using 10 liters of water each time, whereby the alkaloids are dissolved out. Then, from the undissolved residual mass, the fats are dissolved out by treatment with solvents such as ether, petroleum ether or benzol. After concentration, about ½ kg. remains as residue, free from alkaloids and fats, but still containing some glycerides and sterols which may be dissolved out by boiling three times with methanol or ethanol, using 3 kg. of the solvent each time. The residue thus obtained is repeatedly and thoroughly extracted with 15 kg. of a solvent such as chloroform, ethylene chlorhydrine, or phenol. By concentration of the extraction solutions, the new principle is obtained from the least soluble part. The new substance may be purified by recrystallization or by repeated extractions of the soluble portions. The ultimate yield will, of course, vary depending upon the nature of the ergot taken in process.

II. 3 kg. of ground ergot are boiled first with 6 kg., and then 3 times, using 3 kg. each time of petroleum ether and defatted by filtration of the hot petroleum ether solution. The residue is freed from the solvent and then mixed successively first with 6 kg. and then twice, using 3 kg. each time, of a 1% solution of hydrochloric acid and 3 kg. of distilled water with continued stirring for about 8 hours for each step. The liquid is then filtered off by suction and the residue dried. By this treatment the alkaloids will have been substantially removed. The last residue thus obtained is boiled with 10 kg. of chloroform. From the residue of the chloroform solution practically the last traces of fat may be removed by further treatment with 1 kg. of warm petroleum ether and three treatments with 200 gm. of warm ether. Finally the mass is leached out with 2 kg. of hot chloroform and the chloroform solution obtained is strongly concentrated. The end product is obtained in the form of yellow leaflets which may be recrystallized from such solvents as ethylene chlorhydrine, phenol, or cresol.

III. 3 kg. of ergot are boiled first with 6 kg. and then three times, using 3 kg. each time, of trichloro-ethylene and freed from the solvent by pressure. The combined extracts are thoroughly shaken out thrice with 200 cc. of 2% phosphoric acid, in order to remove the alkaloids, then washed with water and evaporated in vacuo. The residue obtained is thoroughly mixed under stirring with 250 cc. of 1% hydrochloric acid solution, separated from this acid solution and dried. The fatty mass is then boiled out twice with petroleum ether, thrice with ether, and finally twice with 1 kg. of chloroform. By concentration of the combined chloroform solutions, the new material is obtained in the form of yellow leaflets, very slightly soluble.

The new ergot principle itself is not an acid, but is easily converted by alkaline solutions into an acid, as for example an acid anhydride or a $\gamma$-lactone. By the action of an excess of alkaline solution a further carboxyl group is liberated by the cleavage of methanol (saponification).

Analysis of the new ergot principle indicates a molecular formula of $C_{16}H_{15}O_7$ with 1 $OCH_3$ group. The molecular weight appears to be double, i. e. $C_{32}H_{30}O_{14}$ with 2 $OCH_3$ groups.

The product produced by alkalies is a reddish-coloured powerful acid, slightly soluble in water, easily soluble in alcohol, acetone and ethyl acetate. It alters slowly on heating and possesses therefore no sharp melting point, decomposition occurring at about 230° C.

Alkaline solutions are sensitive to the oxygen of the air which turns them brown. The cleavage product is free from nitrogen, containing therefore no ergot alkaloids.

I claim as my invention:

1. A new ergot principle having the formula $C_{32}H_{30}O_{14}$, being in the form of yellow leaflets, melting at about 263°, at a pressure of about 30 mm. of mercury with decomposition, and being insoluble or but very difficultly soluble in practically all of the usual solvents.

2. A process for the production of a new principle from ergot which comprises freeing the ergot from alkaloids and fats, extracting the residue with large quantities of a solvent which is capable of dissolving the known yellow ingredients of ergot, ergoflavin and ergochrysin comprising a chlorinated aliphatic compound containing less than four carbon atoms, separating the very slightly soluble new principle from the other constituents of the residue, and purifying it by crystallization.

3. A process for the production of a new therapeutically active principle from ergot which comprises extracting ergot with large quantities of a chlorinated aliphatic compound containing less than four carbon atoms, removing the alkaloids and fats present in the extraction solution, and separating the very slightly soluble new principle from the other soluble substances of the extraction residue.

4. In a process for the production of a new principle from ergot which essentially comprises freeing the ergot from alkaloids and fatty substances, the steps which consist in repeatedly extracting the ergot with chlorinated aliphatic compounds containing less than four carbon atoms, treating the collected extracts with hydrochloric acid to congo-acidity, evaporating the solvent, treating the residue with water to dissolve out the alkaloids, and then dissolving out the fats with solvents such as ether, petroleum ether and benzol.

5. In a process for the production of a new therapeutically active principle from ergot which essentially comprises freeing the ergot from alkaloids and fatty substances, the steps which consist in extracting the ergot with chlorinated aliphatic compounds containing less than four carbon atoms, treating the collected extracts with hydrochloric acid to congo-acidity, evaporating the solvent, treating the residue with water to dissolve out the alkaloids, and then dissolving out the fats with solvents such as ether, petroleum ether and benzol.

OTTO WOLFES.